July 26, 1927.

W. C. ANDERSON 1,636,731

TRACTION WHEEL CLEAT

Filed Sept. 25, 1926

Inventor
William C. Anderson

By Irving Harness

Attorney

Patented July 26, 1927.

1,636,731

UNITED STATES PATENT OFFICE.

WILLIAM C. ANDERSON, OF BARK RIVER, MICHIGAN.

TRACTION-WHEEL CLEAT.

Application filed September 25, 1926. Serial No. 137,756.

It is customary for the manufacturers of farm tractors to provide traction wheels for the tractors which have radially extending cleats thereon. These cleats, however, cannot always be practicably used for the reason that the sharp edges thereof will damage the surface with which they come in contact unless such surface be a material such as earth, which is not affected by the cleats "digging in". Furthermore, the cleats as usually provided do not secure a traction sufficient to prevent the wheels from slipping to a certain extent, with the result that the tractor is often-times stalled under conditions which longer cleats would obviate.

It is the primary object of my invention, therefore, to provide an extension cleat for traction rims which will give the necessary traction effect to prevent the wheels from slipping in soft material and which will also present a flattened contact surface which will not "dig in" to wood, concrete or other like surfaces.

With the above and other objects in view, my invention consists in the arrangement, combination and construction of the various parts of my improved device as described in the specification, claimed in my claim and shown in the accompanying drawing, in which:

Figure 1:
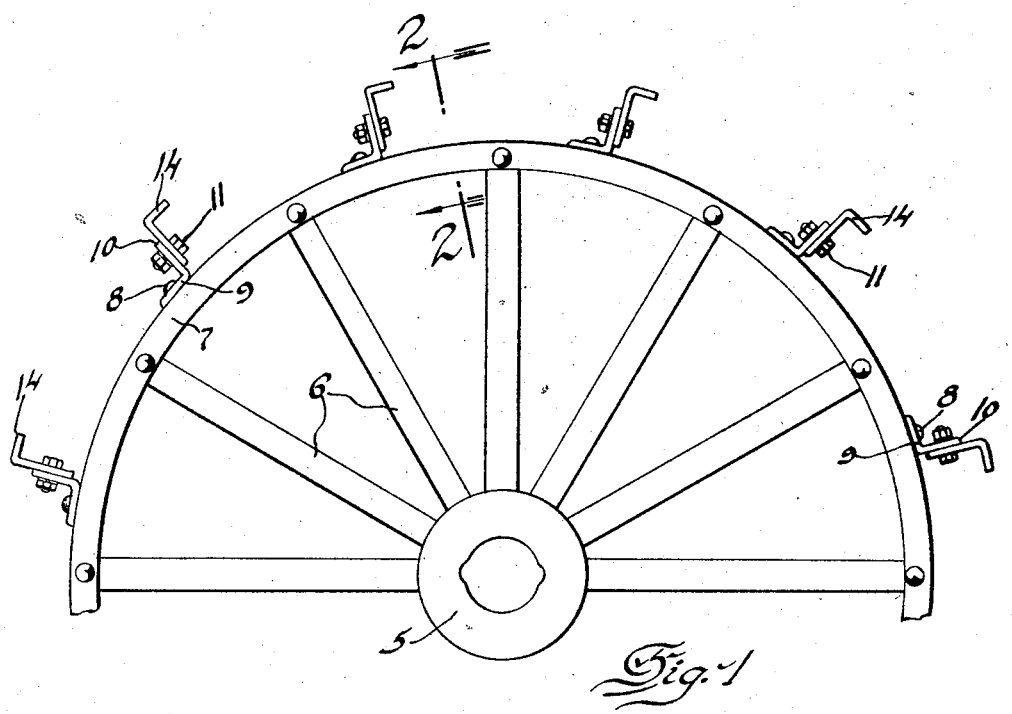
Fig. 1 is a fragmentary view in elevation of a traction wheel having my improved cleats mounted thereon.
Figure 2:
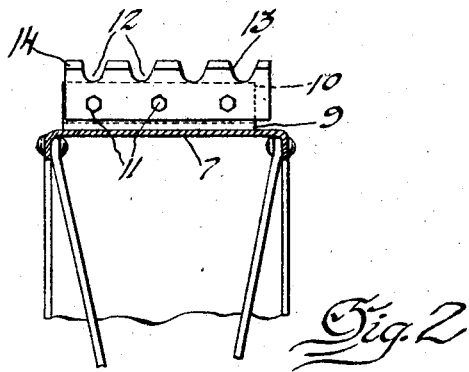
Fig. 2 is a sectional view taken on line 2—2 of Fig. 1.

I have shown a traction wheel consisting of a hub 5, spokes 6 and rim 7. Fixedly secured to the rim 7 by means of rivets 8 are a plurality of cleats having a rim engaging portion 9 and a radially extending portion 10.

My improved extension cleat is adapted to be secured, one to each of the first mentioned cleats, and comprises a plate 10 secured by a plurality of bolts 11 to the radially extending portion 10 of the main cleat. A plurality of notches 12 are provided in the outer ends of the plates 10 so as to provide a plurality of ground-engaging portions which will penetrate with greater ease than a single unitary surface of much greater width. Thus, ground engaging prongs 13 are provided.

Each of the ground engaging prongs 13 is bent over its extreme outer end to form the flange 14 substantially at right angles to the body of the cleat. When the traction wheel is rotated the flanges 14 will form a relatively flat surface which will prevent damage being done to the surface with which they contact, if such surface be a relatively hard one such as wood, concrete and the like. The surface, however, is not of sufficient extension to prevent the cleat from entering a soft surface such as soft earth, when it is desired that they so penetrate in order to obtain tractive effect.

It will be obvious that various changes may be made in the arrangement, combination and construction of the various parts of my improved device without departing from the spirit of my invention and it is my intention to cover by my claim such changes as may be reasonably included within the scope thereof.

What I claim is:

A traction wheel extension cleat comprising a body portion adapted to be secured to a main cleat, said extension having a notched outer end, the portions of the cleat between the notches being bent over to provide relatively flat ground engaging portions.

WILLIAM C. ANDERSON.